United States Patent Office 3,260,754
Patented July 12, 1966

3,260,754
PREPARATION OF REACTION PRODUCTS OF DIBORANE AND CONJUGATED DIOLEFINS
Eugene J. DeLorenzo, Bronx, N.Y., and Robert V. Wright, North Highland, Calif., assignors to Olin Mathieson Chemical Corporation, a corporation of Virginia
No Drawing. Filed Apr. 20, 1961, Ser. No. 104,474
16 Claims. (Cl. 260—606.5)

This invention relates to the preparation of solid and liquid reaction products of diborane and a conjugated diolefin.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this application can be employed as fuels according to the method described in application Serial No. 497,407, filed March 28, 1955, now U.S. Patent No. 2,999,117, by Elmas R. Altwicker, Alfred B. Garrett, Samuel W. Harris and Earl A. Weilmuenster.

In accordance with this invention, diborane is reacted with a conjugated diolefin having 4 to 5 carbon atoms while the reactants are in admixture with a hydrocarbon solvent.

Suitable conjugated diolefins include 1,3-butadiene, 2-methyl-1,3-butadiene (isoprene) and the like.

Suitable hydrocarbon solvents include n-pentane, n-hexane, methylcyclohexane, and other well-known organic solvents composed entirely of carbon and hydrogen.

The ratio of reactants can be varied widely, generally being in the range of 0.1 to 10 moles of diborane per mole of the conjugated diolefin and preferably in the range of 0.2 to 3 moles of diborane per mole of conjugated diolefin. The ratio of the hydrocarbon solvent employed can also be varied widely, generally being in the range of 0.5 to 20 moles of hydrocarbon solvent per mole of diborane and preferably in the range of 1 to 15 moles of hydrocarbon solvent per mole of diborane. The reaction temperature can vary widely, generally being from 50° to 200° C. and preferably less than 150° C. The reaction is initiated by heating the reaction mixture to a temperature at which a spontaneous exothermic reaction occurs, generally about 30°–70° C. depending upon the proportions of reactants and solvent employed. When the molar ratio of diborane to butadiene exceeds about 1:1, the temperature of the reaction mixture is advantageously slowly raised to the initiation temperature at a rate of about 4 to 5 degrees per minute. Also, when the molar ratio of diborane to butadiene exceeds about 1:1, the reaction mixture advantageously is heated after the spontaneous exothermic reaction subsides at a temperature within the range of about 60° to 150° C. for from two to four hours. The reaction generally requires 1 minute to about 10 hours, depending on the particular reactants, the ratio of the reactants and the temperature and pressure employed.

The products obtained vary both in physical and chemical properties and chemical structure, depending upon the particular reaction conditions, reactants and proportion of reactant elected. Thus, for example, the products can be liquid and/or solid, monomeric and/or polymeric, volatile and/or non-volatile. They can be trialkylated boranes and 1:1 adducts of diborane and the conjugated diolefin. The method of this invention including variations in rate of heating to reaction initiation temperature and reactant proportions, together with the types of products produced thereby, will be more clearly illustrated by the following examples.

*Examples I–IV*

In these four examples the hydrocarbon solvent was introduced into a high-pressure stainless-steel reaction vessel which was then sealed and cooled to −78° C. The air was pumped out of the cylinder and a measured amount of 1,3-butadiene was condensed into it. The cylinder was then cooled to −198° C. and a measured amount of diborane was condensed into it. The sealed reactor was then placed in an electrically heated oil bath. In Examples I–III the reactor was connected to a rocking mechanism and magnetic stirring was used in Example IV. The reaction vessel was provided with a 0 to 1000 p.s.i.g. pressure gauge and a thermocouple for measuring the vapor-liquid interface temperature.

After each experiment, the gaseous product in the reactor was expanded into a vacuum system. The liquid and solid products were removed in a nitrogen-dry box. The proportions of reactants, solvent employed, reaction conditions and product analyses of the four examples are set forth in Table I.

TABLE I

| Ex. No. | $B_2H_6$, mole | $C_4H_6$, mole | Solvent, mole | Temperature, °C. | Time, hour | Pressure, p.s.i.g. | Product | Product Solvent Removed | Product Analysis |
|---|---|---|---|---|---|---|---|---|---|
| I | .0156 | .0605 | n-Pentane, .2 | 100 | 2½ | 80 | Clear sol | Oil | |
| II | .0132 | .0746 | n-Hexane, .2 | 100 | 2½ | 100 | Solid plus clear sol. | do | Solid, 33 percent B: oil, 26 percent B. |
| III | .0153 | .0765 | n-Pentane, .2 | 100 | 2½ | 100 | Clear sol | do | |
| IV | .506 | .965 | Methylcyclohexane, .306. | 100 | 1½ | 150 | Brown sol | Brown oil | 22.25 percent B. |

From the examples in Table I, it can be seen that diborane reacts with an excess of 1,3-butadiene in a hydrocarbon solvent to produce liquids containing up to 26 percent boron. The reaction is exothermic and initiated under these particular conditions at about 70° C. When the reaction was once initiated, there was a rapid increase in interface temperature and a rapid pressure surge. The interface temperature returned to the bath temperature within about one-half to fifteen minutes upon the termination of the exothermic reaction. This temperature decrease was accompanied by a decrease in pressure.

The use of n-pentane as the solvent in Examples I and III, produced a clear, colorless oil. No diborane was recovered in the gaseous products.

The use of n-hexane in Example II resulted in the production of a brown oil together with a high boron content solid which was insoluble in n-hexane. Infrared analysis indicated the absence of bridge hydrogen and terminal B—H bonds in the liquid and suggested that the product was a trialkylated borane.

Mass spectrometric data on the product of Example IV in which methylcyclohexane was employed, indicated that a monomer of butadiene and diborane had been produced. The ratio of butadiene to diborane based on boron analysis was 1 to 0.4. Infrared analysis indicated the presence of higher boranes and alkylated diborane. The presence of bridge hydrogen and terminal B—H bonds was also indicated.

Thus, in the method of this invention the diborane is caused to react with the diolefin rather than merely catalyze the polymerization of the diolefin as was previously known in the art.

Examples V–XI

In each of these examples the hydrocarbon solvent was introduced into a high-pressure stainless-steel cylinder which was then sealed and cooled to −78° C. The air was pumped out of the cylinder and a measured amount of 1,3-butadiene was condensed into it. The cylinder was then cooled to −198° C. and a measured amount of diborane was condensed into it. The cylinder was then connected to a rocking mechanism in an electrically heated silicone oil bath. Heat was then applied and the temperature was raised to 100° C. where it was maintained for 2½ hours.

The gas evolved during the reaction was measured and subjected to mass spectrometric analysis. The products of the reaction were transferred into a distillation flask and the volatile components, consisting of the solvent and a monomeric product, were distilled off under 100 mm. Hg pressure absolute and room temperature. The last traces of the volatile components were removed under 1 mm. Hg of pressure absolute and 30° C. Active hydrogen determinations were made by adding methyl alcohol to a known amount of sample and measuring the volume of hydrogen given off. One-half of this volume is contributed by the sample. Samples of the volatile and nonvolatile liquids were submitted for infrared analysis. Table II summarizes the experimental data gathered from the reactions involving a molar ratio less than 1:1 of diborane to 1,3-butadiene in the presence of a hydrocarbon solvent.

TABLE II

| Example Number | Cylinder Size, ml. | Diborane, mole | Butadiene, mole | Solvent | Pressure, p.s.i.g. | Product in Solvent |
|---|---|---|---|---|---|---|
| V | 150 | .0156 | .0605 | n-Pentane | 80 | Clear solution. |
| VI | 150 | .0312 | .0746 | n-Hexane | 100 | Solids and clear yellow solution. |
| VII | 150 | .0153 | .0705 | n-Pentane | 100 | Clear solution. |
| VIII | 70 | .0145 | .0748 | ----do---- | 100 | Do. |
| IX | 70 | .0159 | .0759 | n-Hexane | 70–50 | Do. |
| X | 150 | .0153 | .0749 | ----do---- | 70–50 | Do. |
| XI | 70 | .0153 | .0769 | n-Pentane | 120–115 | Solid and clear yellow solution. |

| Example Number | Product Solvent Removed | Boron Analysis | Total Gas, mole | $H_2$, mole | Gaseous $B_2H_6$, mole | Products $C_4H_6$, mole | Solvent, mole |
|---|---|---|---|---|---|---|---|
| V | Clear oil | | .0024 | .011 | .0011 | .0046 | |
| VI | Yellow oil-like liquid. | 33 percent solid, 26 percent oil. | | | | | |
| VII | Clear oil | | | | | | |
| VIII | ----do---- | 10.68 | .0245 | .0016 | .00012 | .0055 | .0078 |
| IX | ----do---- | 9.79 | .0155 | .0013 | .00028 | .00465 | .00403 |
| X | 3.5 g. clear oil | 6.61 | .0267 | .00507 | .00032 | .0142 | .00267 |
| XI | 2.3 g. oil and solid. | | .0305 | .00610 | .00140 | .00898 | .00610 |

Note.—In each case, 0.2 mole of solvent was used and the reactants were maintained at 100° C. for 2½ hours.

In these examples, the reactants were heated to 100° C. and maintained at this temperature for 2½ hours in a closed system. Analysis of the liquid products indicated the absence of bridge hydrogen, absence of terminal B—H bonds, negligible active hydrogen content, presence of unsaturation and a boron content of about 6 to 10 percent. Thus, it appears that one of the components of the product is tributenyl borane $$B(CH_2\text{—}CH_2\text{—}CH\text{=}CH_2)_3$$

and/or its polymers.

Examples XII–XV

In these examples a high-pressure stainless-steel cylinder was employed such as in Examples V to XI and the reactants and solvens were introduced into the cylinder in the same manner as in Examples V to XI. The high-pressure cylinder was provided with a 0 to 1000 p.s.i.g. pressure gauge and a thermocouple, whereby the interior pressure of the cylinder and the interface temperature of the reactants in the cylinder were measured. After the reactants and solvents were charged, the cylinder was connected to a rocking mechanism. In Example XIV the reactants were heated to a temperature of 100° C., which temperature was maintained for one hour as in Example V. In examples XII, XIII and XV the reactants were gently heated to approximately 40° C. with warm air at which time the exothermic reaction commenced and raised the interface temperature to well over 100° C. for approximately 15 minutes. Again, as in Examples V to XI the gas evolved during the reaction and the products of the reaction were analyzed. The solvent in all four of these examples was n-pentane employed in the quantity of 0.3 mole. The pertinent data appear in the following Table III.

TABLE III

| Example Number | B₂H₆ G. | B₂H₆ Mole | C₄H₆ G. | C₄H₆ Mole | Maximum pressure, p.s.i.g. | Product | Infrared date | Active H | B, percent by wt. | C, percent by wt. | H, percent by wt. | Solids |
|---|---|---|---|---|---|---|---|---|---|---|---|---|
| XII | 4.06 | .1448 | 4.06 | .0760 | 260 | 4.505 g | B-H, C-H, Bridge B-H | | 20.5 | 66.3 | 14.3 | No. |
| XIII | 4.06 | .1452 | 4.13 | .0763 | 310 | 3.330 g | B-H, C-H, Bridge B-H | | 22.9 | | | Trace. |
| XIV | 6.43 | .2225 | 4.05 | .0750 | 410 | 3.746 g. (total of liquid and solid). | | .0204 g./mole or 3.36 hydrogens per molecule. | 31.3 | 55.7 | 13.5 | Yes.ᵃ |
| XV | 3.92 | | 4.05 | | 215 | 4.620 g | | .0173 g./mole or 2.8 hydrogens per molecule. | 20.0 | | | No. |

ᵃ 52 percent boron; boric acid, water, bridge B-H.

As opposed to the experiments of Examples I–XI in which a diborane-1,3-butadiene ratio of less than 1:1 was employed, the experiments of these examples were conducted employing a diborane-1,3-butadiene ratio greater than 1:1, i.e., such that the butadiene and diborane in n-pentane were generally in the molar ratio of 1:2:3, respectively. The reactions of these examples were generally exothermic, once initiated, and the heat of evolution was accompanied by a pressure decrease as liquid polymers were formed. As was expected, unreacted diborane was present at the end of the experiments due to the initial excess of diborane.

Infrared analyses of the clear liquid products obtained indicated the presence of terminal B—H bonds and bridge hydrogen bonds of the diborane type. The determination of 3.36 active hydrogen atoms per molecule in Example XIV compares well with the theoretical value of 4 active hydrogen atoms per molecule (based on polybutenyl diborane). The theoretical boron, carbon, and hydrogen percentage agree closely with the actual analyses as shown in Table III–A.

TABLE III–A

| | Theoretical, percent | Observed Example XIV, percent | Observed Example XII, percent |
|---|---|---|---|
| Boron | 26.5 | 31.04 | 20.52 |
| Carbon | 58.8 | 55.72 | 66.31 |
| Hydrogen | 14.7 | 13.58 | 14.32 |

The volatile material removed by distillation consisted of the n-pentane solvent and a boron containing material. Mass spectrometric analysis indicated a material with a molecular weight of 82. The volatile mixture does contain active hydrogens. Some portions of its infrared spectrum correspond well with the spectrum for the non-volatile product. Thus, the results of the analyses indicate that the volatile product includes monomeric butenyl diborane.

A comparison of the products obtained in Examples V–XI and XII–XV shows that a variety of products can be obtained from the method of this invention by varying the proportions of the reactants. The experiments of Examples V–XI, in which an excess of butadiene was employed, yielded products including a tri-alkylated borane while the experiments of Examples XII–XV, in which an excess of diborane was employed, yielded products including a 1:1 adduct of diborane and butadiene.

*Examples XVI–XX*

Following the procedure outline in Examples XII–XV, 0.075 mole of 1,3-butadiene, 0.150 mole of diborane, and 0.2 mole of n-pentane were introduced into a high-pressure cylinder and subjected to gentle heating until the initiation temperature at different rates. The pertinent data erally illustrate the effect of heating the reactants to initiation temperature at different rates. The pertinent data appear in the following Table IV.

TABLE IV

| Example No. | Initial Reaction Conditions Temp., °C. | Initial Reaction Conditions Pressure, p.s.i.g. | Maximum Conditions Temp., °C. | Maximum Conditions Pressure, p.s.i.g. | Heating Period, min.ᵃ | Gaseous Products Moles | Gaseous Products Mole percent H₂ | Gaseous Products Mole percent B₂H₆ | Non-volatile liquid Percent Yield | Non-volatile liquid Percent B | Solids |
|---|---|---|---|---|---|---|---|---|---|---|---|
| XVI | 48 | 170 | >100 | 200 | 86 | | | | 52 | 20.1 | No. |
| XVII | 69 | 177 | >125 | 240 | 78 | 0.09996 | 9 | 50 | 58 | 19.6 | No. |
| XVIII | 51 | 200 | 163 | 550 | 30 | 0.17645 | 67.6 | 18.2 | | | Yes.ᵇ |
| XIX | 56 | 186 | 114 | 250 | 66 | 0.07055 | 7 | 61 | 54 | | No. |
| XX | 65 | 194 | >150 | >600 | 50 | 0.1555 | 58 | 12 | 41 | | 0.5138 g. |

ᵃ Period required to heating from −198° C. to initial reaction temperature.
ᵇ Contains 76.1 percent boron.

Thus, it appears that the clear liquid product is mainly butenyl diborane and polybutenyl diborane in different degrees of polymerization.

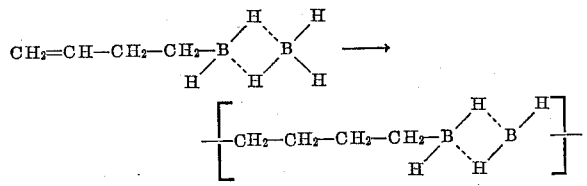

According to the process illustrated by experiments XVI, XVII and XIX, the reactants were warmed slowly from −198° C. to +55° C. during a period of more than one hour. In these three examples a sharp surge to approximately 250 p.s.i.g. and a temperature rise to approximately 125° C. was observed after the initiation of the reaction.

In Examples XVIII and XX, the reactants were heated from −198° C. to +55° C. in less than one hour. In these examples there was a pressure surge to 550–600 p.s.i.g. and a temperature rise to approximately 160° C. after the reaction had been initiated.

The gaseous products from experiments XVI, XVII and XIX, were subjected to mass spectrometric analysis which indicated that only a small amount of hydrogen was contained in the gases. The other products obtained from these examples were non-volatile, clear, colorless, oil-like liquids and a clear, colorless n-pentane solution containing a volatile boron compound.

The gas from experiments XVIII and XX was largely hydrogen and the products consist of "yellow solids," a clear, yellow, non-volatile liquid and a clear n-pentane solution containing a volatile boron compound.

Infrared analysis of the yellow non-volatile oil from experiments XVIII and XX, and the colorless oil from experiments XVI, XVII, and XIX showed them to be essentially the same.

The main difference between the two modes of conducting the reaction of butadiene with diborane shown by Examples XVI-XX is the formation of "yellow solids" and hydrogen when rapid heating is employed. The volatile and non-volatile products appear to be the same according to infrared analysis. The yield of non-volatile product, however, drops from the 50 to 60 percent range to about 40 percent when the reaction mixture is rapidly heated. Thus, a non-volatile liquid containing 20 percent boron can be produced in 40 to 60 percent yields when slowly or rapidly heated. This liquid has been found to be stable up to 100° C.

Further analyses of the products obtained from the reaction of 1,3-butadiene and diborane in n-pentane in a 1:2:4 molar ratio were conducted. The properties of the products are listed below.

(1) *Physical properties of non-volatile product*:
 (a) Clear, colorless liquid.
 (b) Density at 25° C: 0.89 g./cc.
 (c) Molecular weight: 200 to greater than 500 (estimated).
 (d) Infrared analysis indicates carbon-hydrogen bonds, terminal boron-hydrogen bonds and bridge boron-hydrogen bonds. The presence of doubly bonded carbon could not be estimated.
 (e) Boiling point: approximately 50 percent of the product distilled at 45° to 85° C. under 0.0001 mm. Hg pressure with the use of a molecular still.

(2) *Chemical properties of non-volatile product*:
 (a) Typical chemical analysis: boron, 20 percent; carbon, 65 percent; hydrogen 15 percent.
 (b) Active hydrogen content (by methanolysis), approximately 2 active hydrogens per boron.
 (c) Not pyrophoric in bulk in air.
 (d) Pyrophoric on paper or cloth.
 (e) Hydrolyzes rapidly in air.
 (f) Decomposes at 180° C. in an inert atmosphere.

(3) *Properties of volatile product*:
During the preparation of the 1,3-butadiene-diborane product a clear colorless liquid is formed in 9 percent uncorrected yield. This product has properties similar to those described for the non-volatile product but has a molecular weight of 82 and a much lower boiling point.

The structure of the non-volatile 1,3-butadiene-diborane product is believed to be one of the following:

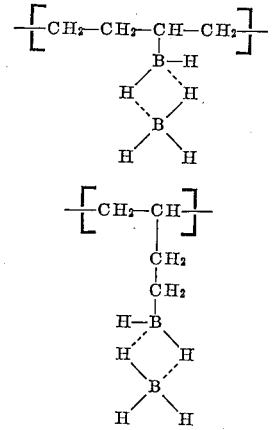

*Examples XXI-XXVI*

The equipment and procedures employed in these examples were generally the same as those of Examples V-XX. The pertinent data appear in the following Table V. In these examples a ratio of diborane to butadiene greater than 2:1 was employed and the reaction mixture resulting from the initial reaction was subjected to pyrolysis conditions to produce non-volatile products of higher boron content.

TABLE V

| Expt. No. | Butadiene, moles | Diborane, moles | n-pentane, moles | Other Ingredients, moles | Initial Temp., °C.[a] | Maximum Temp., °C.[b] | Time, min. | Pyrolysis[c] Temp., °C. | Pyrolysis[c] Temp., hr. | Boron Content of Non-Volatile Product Percent Boron |
|---|---|---|---|---|---|---|---|---|---|---|
| XXI | .075 | .150 | .2 | Nitrogen, 13.6 | 55 | 130 | 1 | | | 21 |
| XXII | .075 | .150 | | do | 40 | 120 | <1 | | | 17.5 |
| XXIII | .075 | .225 | .2 | | 29 | 110 | | 90 | 3¼ | 21.7 |
| XXIV | .075 | .205 | .2 | | 50 | 180 | 1 | 65 | 2 | 30 |
| XXV | .04 | .142 | .4 | | 40 | 60 | [d] 20 | 72 | 3 | 30.0 |
| XXVI | .075 | .275 | .4 | | 35 | 72 | [d] 15 | 77 | 2¾ | 28.9 |

[a] Initial temperature is the temperature at which the initial reaction between diborane and butadiene began.
[b] Maximum temperature is the maximum recorded temperature during the initial reaction.
[c] The pyrolysis conditions refer to the heating of the reactor containing the products of the initial reaction.
[d] It can be observed that diluting the reaction with n-pentane slows the reaction.

In Examples XXI and XXII, the effect of conducting 1,3-butadiene-diborane reaction in a 1:2 molar ratio under imposed nitrogen pressure in the absence and in the presence of n-pentane was determined. As can be seen there is a substantial difference in the boron content of the product and the presence of the n-pentane required a higher temperature to initiate the reaction.

In Examples XXIII, XXIV, XXV and XXVI, the 1,3-butadiene-diborane reaction was conducted employing an excess of diborane and varying amounts of n-pentane. The heating of the reactants was continued after completion of the initial reaction resulting in pyrolysis. A comparison of the boron content of the non-volatile products showed that the boron content of the final product can be increased from the normal 20 percent range obtained in Examples XII, XV, XVI, XVII, XXI and XXII to about 30 percent by changing the 1,3-butadiene-diborane molar ratio to 1:3 and pyrolyzing the reaction product from the initial reaction.

Infrared analysis of the pyrolyzed product indicates the presence of a decaborane type structure. There was no evidence of pentaborane (9) or tetraborane structures.

While the examples show pyrolizing the total reaction products resulting from the initial exothermic reaction, it will be obvious to those skilled in the art that the unpyrolyzed, non-volatile reaction products of the reaction of diborane and a conjugated diolefin can be separated from the other reaction products and pyrolyzed in the presence of additional diborane to produce a non-volatile product of increased boron content.

In addition to those hydrocarbon solvents shown in the examples and specifically mentioned other hydrocarbon solvents which can be employed in the method of this invention include aliphatic hydrocarbon solvents such as hexane and heptane, aromatic hydrocarbon solvents such as benzene, toluene and xylene and cycloaliphatic solvents such as cyclohexane and methylcyclopentane.

The boron containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellent composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and the thereafter intimately mixing them. The purpose in doing this, as the art is wel aware, is to provide proper burning characteristics in the final propellant. In addition to the oxidizer and the oxidizable material, the final propellant can also contain an artificial resin generally of the urea-formaldehyde or phenol-formaldehyde type. The function of the resin is to give the propellant mechanical strength and at the same time improve its burning characteristics. Thus, in the manufacture of a suitable propellent, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the abolute ceiling of the aircraft, which may be 65,000 feet or 70,000 feet or higher. The compression ratios of the current and near future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuels presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures, and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as air-craft gas turbine fuels in admixture with the hydrocarbons presently being used, such as JP–4. When such mixtures are used, the fuel air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and by-pass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operations with conventional aircraft fuels.

The burning characteristic of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

I claim:
1. A method for the preparation of reaction products of diborane and a conjugated diolefin which comprises reacting 1 to 10 moles of diborane per mole of a conjugated diolefin hydrocarbon containing 4 to 5 carbon atoms at a temperature within the range from about 0° C. to about 200° C. while the reactants are in admixture with a hydrocarbon solvent.
2. The method of claim 1 in which the conjugated diolefin is 1,3-butadiene.
3. The method of claim 1 in which the hydrocarbon solvent is n-pentane.
4. The method of claim 1 in which the hydrocarbon solvent is n-hexane.
5. The method of claim 1 in which the hydrocarbon solvent is methylcyclohexane.
6. The method of claim 1 in which the conjugated diolefin is 1,3-butadiene and the hydrocarbon solvent is n-pentane.
7. The method of claim 1 in which the conjugated diolefin is 1,3-butadiene and the hydrocarbon solvent is n-hexane.
8. The method of claim 1 in which the conjugated diolefin is 1,3-butadiene and the hydrocarbon solvent is methylcyclohexane.
9. The method of claim 1 in which the molar ratio of conjugated diolefin to diborane is from 3:1 to 10:1.
10. The method of claim 1 in which the molar ratio of conjugated diolefin to diborane is from 1:2 to 1:5.
11. The method of claim 10 in which the reaction mixture is heated at a rate of 4–5 degrees per minute to a temperature of about +50° C.
12. The method of claim 11 in which the conjugated diolefin is 1,3-butadiene and the hydrocarbon solvent is n-pentane.
13. A method for the preparation of reaction products of diborane and a conjugated diolefin which comprises (1) reacting from about 1.0 to 10.0 moles of diborane per mole of a conjugated diolefin hydrocarbon containing 4 to 5 inclusive carbon atoms under autogenous pressure at a temperature of from about 0° C. to about 200° C. while the reactants are in admixture with a hydrocarbon solvent, (2) heating the reaction mixture thus formed under autogenous pressure at a temperature of from about 60° C. to about 150° C. for about 2 to 4 hours and (3) recovering the reaction product thus produced.
14. The method of claim 13 wherein the hydrocarbon solvent is n-pentane.
15. The method of claim 13 wherein the conjugated diolefin is 1,3-butadiene.
16. The method of claim 13 wherein the conjugated diolefin is 1,3-butadiene and the hydrocarbon solvent is n-pentane.

References Cited by the Examiner

UNITED STATES PATENTS

| | | | |
|---|---|---|---|
| 2,964,567 | 12/1960 | Neff | 260—606.5 |
| 3,008,997 | 11/1961 | Saegebarth | 260—606.5 |
| 3,103,537 | 9/1963 | Rutkowski | 260—606.5 |
| 3,129,251 | 4/1964 | Rutkowski | 260—606.5 X |

OTHER REFERENCES

Brown et al., J. Am. Chem. Soc., vol. 81, pp. 5832–3 (Nov. 5, 1959).

Brown et al., J. Org. Chem., vol. 22, pp. 1136–7 (1957).

TOBIAS E. LEVOW, *Primary Examiner.*

LEON D. ROSDOL, *Examiner.*

L. A. SEBASTIAN, F. R. OWENS, W. F. W. BELLAMY,
*Assistant Examiners.*